Jan. 16, 1923.

I. H. KAUFMAN.
VACUUM TRAP.
FILED NOV. 26, 1921.

INVENTOR
Irvin H. Kaufman
BY
ATTORNEYS

Jan. 16, 1923.
I. H. KAUFMAN.
VACUUM TRAP.
FILED NOV. 26, 1921.
1,442,575
3 SHEETS-SHEET 2
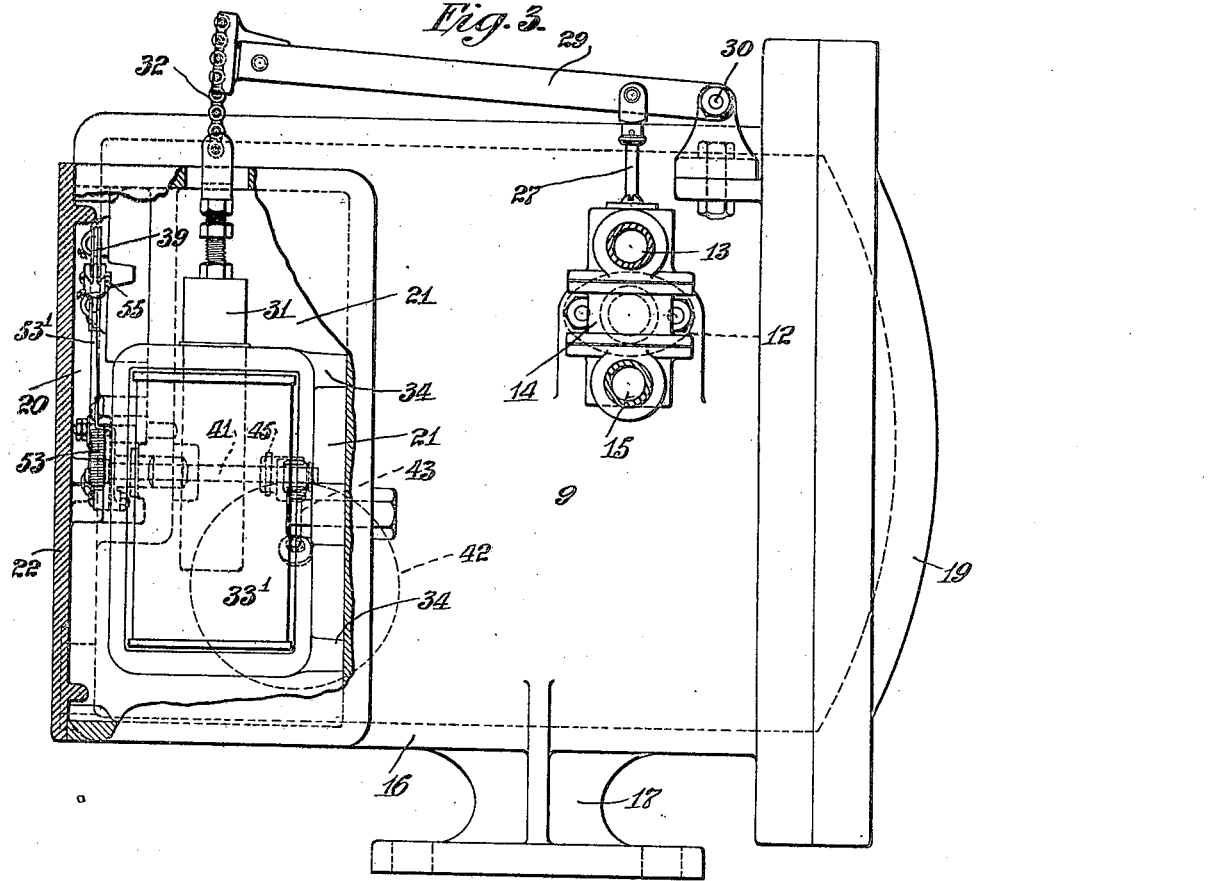
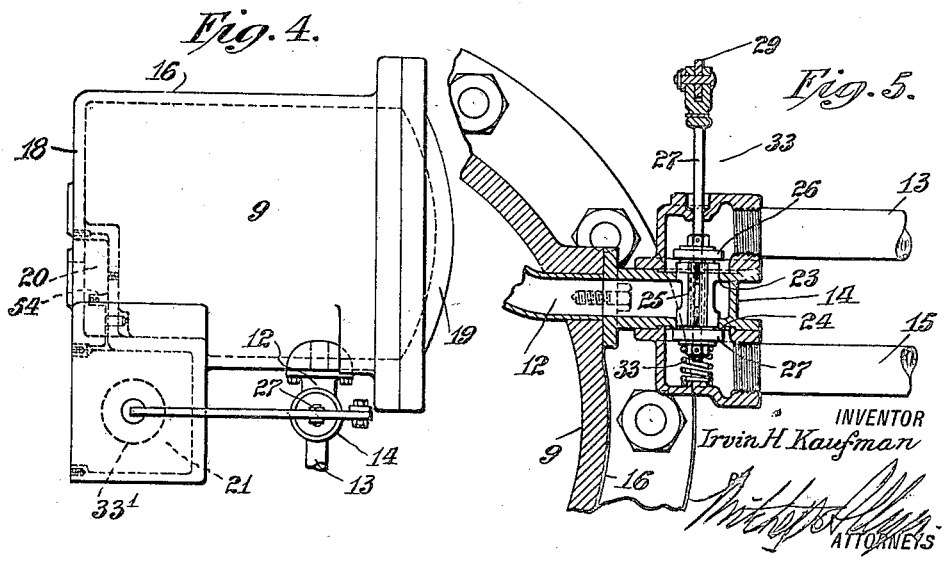
INVENTOR
Irvin H. Kaufman
ATTORNEYS Jan. 16, 1923.

I. H. KAUFMAN.
VACUUM TRAP.
FILED NOV. 26, 1921.

INVENTOR
Irvin H. Kaufman

Patented Jan. 16, 1923.

1,442,575

UNITED STATES PATENT OFFICE.

IRVIN H. KAUFMAN, OF NEW YORK, N. Y., ASSIGNOR TO THE BLACKBURN-SMITH CORPORATION, OF NEW YORK, N. Y., A CORPORATION OF NEW YORK.

VACUUM TRAP.

Application filed November 26, 1921. Serial No. 517,925.

*To all whom it may concern:*

Be it known that I, IRVIN H. KAUFMAN, a citizen of the United States of America, residing at New York city, New York County, N. Y., have invented a new and useful Vacuum Trap, of which the following is a specification.

My invention relates to a trap and is particularly adapted for receiving liquid or condensate from an exhaust line and discharging the same.

It is the general object of the invention to improve generally the construction of devices of the character indicated.

It is a more specific object to provide a trap in which the working parts are properly protected and yet are readily accessible for renewal or repair.

It is a further object to provide a machine in which the parts are compactly assembled.

Other objects and details of improvement will be apparent as the specification proceeds.

Briefly stated, my invention in its preferred form includes a trap chamber having a liquid inlet pipe leading from an exhaust line or other source. A liquid discharge pipe is provided for conducting the discharge from the trap chamber to a hot well or other desired location. A connection is provided between the vapor space of the vacuum line and the trap chamber. A motive fluid line is likewise connected to the trap chamber. Between these lines is interposed valve mechanism for alternately connecting the trap chamber with the vacuum line and with the motive fluid line. The valve is actuated by electromagnetic means, and the circuit to the latter is alternately made and broken by suitable switch mechanism actuated by a float within the trap chamber rising and falling with the level of liquid therein.

In the drawings, I have shown for illustrative purposes, a preferred form of my invention.

Fig. 3 is a side elevation of the parts shown in Fig. 2, but having the cover plate in place and parts being shown in section.

Fig. 4 is a top plan view of the trap, parts being omitted for the sake of clearness.

Fig. 5 is an enlarged detail fragmentary view of the trap chamber showing the motive fluid valve in the raised position.

Figure 1:
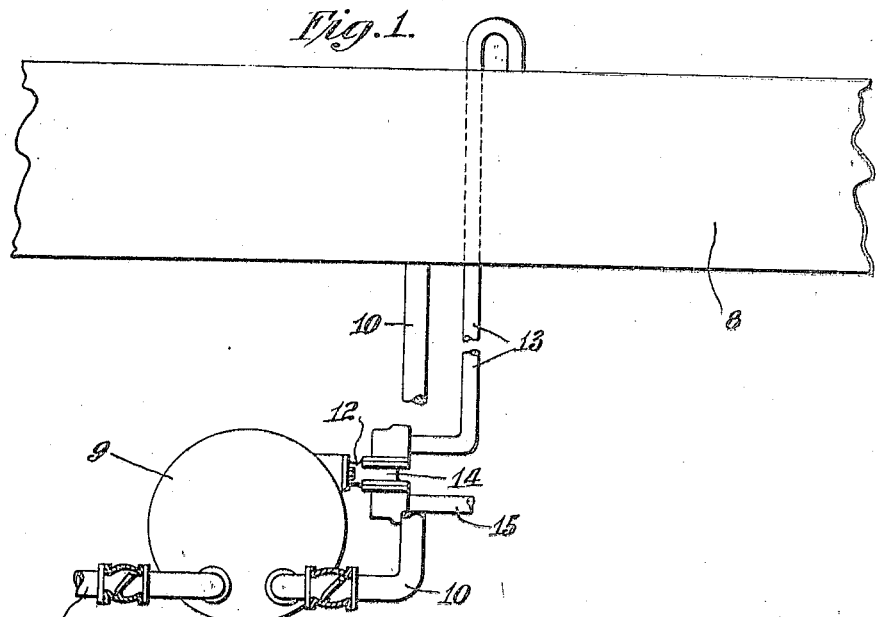
Fig. 1, is a diagrammatic view illustrating my invention connected to an exhaust line.

In said drawings, 8 indicates a portion of a vacuum or exhaust line. 9 indicates a trap chamber forming a part of my invention. A valve and connection 10 is provided between the lower part of the vacuum line and the chamber 9. The valved liquid outlet pipe 11 extends from the trap chamber to a hot well or other discharge point. 12 indicates a connection from the chamber 9 for admitting and exhausting motive fluid. A pipe 13 leads from the vapor space of the exhaust line 8 to a valve chamber 14. A pipe 15 connects the valve chamber 14 to a suitable source of motive fluid such as steam.

Figure 2:
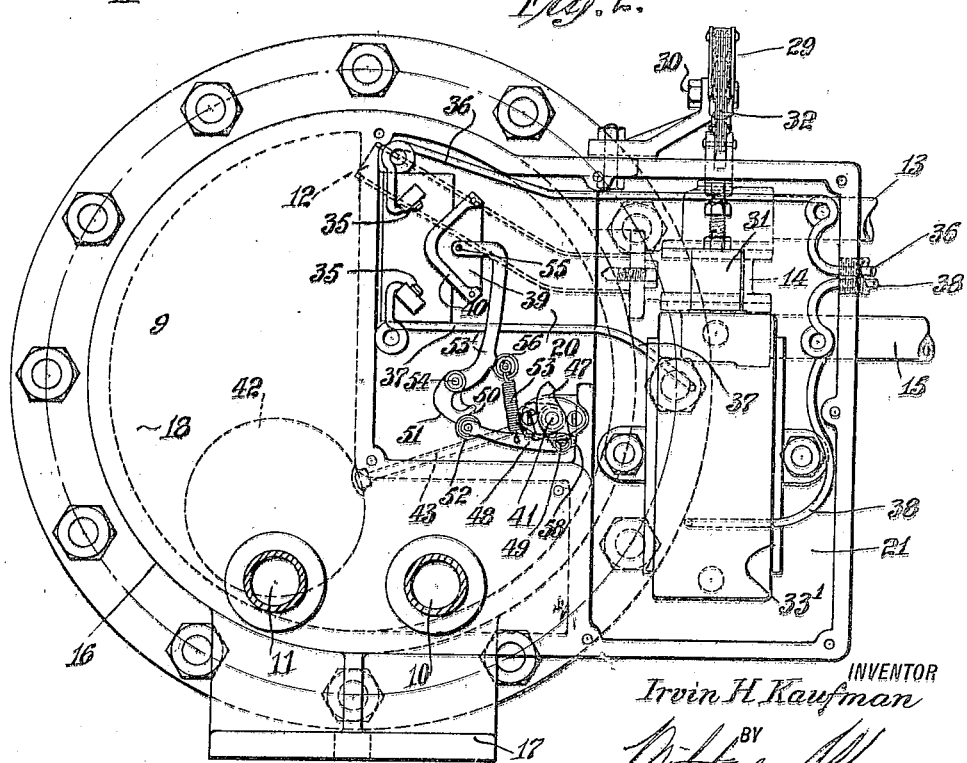
Fig. 2 is an end view in elevation of the trap showing the cover plate of the solenoid and switch chamber removed.
Figure 6:
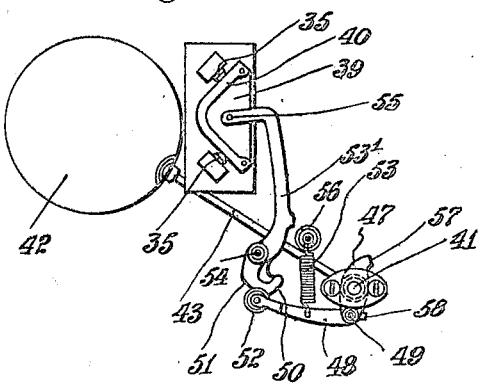
Fig. 6 is a detail end view of the switch mechanism and showing the float in its upper extreme position.

As disclosed particularly in Figs. 2, 3, and 4, a preferred form of trap chamber includes a shell 16 supported in any suitable manner such as 17. The shell is preferably cast closed at one end as indicated at 18, while the opposite open end is closed by a suitable cover 19. A switch chamber 20 is provided, and this chamber is preferably cast integrally with the trap chamber 9. The switch chamber 20 for accommodating the switch parts in the form shown is comparatively shallow and occupies but small space.

A solenoid chamber 21 is provided, and in the preferred form this chamber is likewise formed integrally with the trap chamber. A cover plate 22 may serve to close both the switch and solenoid chambers. It will be seen that by removing the cover plate 22, the parts in the switch and solenoid chambers are readily accessible for renewals or repairs.

The valve structure 14 in the preferred form shown includes valve seats 23—24. A valve spider 25 has secured thereto valve discs 26, 27 adapted to alternately seat on the seats 23—24. The valve stem 27 connects the valve discs and extends through the valve casing. The inner end of the pipe or connection 12 preferably extends to a point near the upper end of the trap chamber, as is more clearly shown in Fig. 2. The valve may be actuated by means of a lever 29, which is pivoted at a suitable point 30. The free end of the lever is actuated by means of a solenoid core 31. In the form shown a flexible connection or chain 32 connects the lever and the solenoid core. In order to actuate the valve in the opposite direction, suitable means, such as the spring 33, are provided. This spring may be conveniently positioned in the valve casing beneath the valve and may bear against the valve casing and against the lower end of the valve. It will be seen that the spring 33 tends to move the valve to its uppermost position, so as to seat the disc 27. When the solenoid is energized, as hereinafter described, the core is drawn down and the valve is moved against the spring 33 so as to unseat the disc 27 and seat the disc 26.

33' indicates conventionally the coils of the solenoid which surround the core 31. This solenoid is positioned within the solenoid chamber 21 hereinbefore described, and may be conveniently attached, as by means of brackets 34—34.

In the switch chamber are located a pair of fixed contacts 35—35. To one of these contacts is connected a wire 36 from a suitable source of current. From the other contact a wire 37 leads to one terminal of the solenoid, while a wire 38 leads from the other terminal of the solenoid to the source of current last mentioned. A bridging switch contact is provided for connecting the contacts 35—35. This bridging contact may comprise an insulating blade 39, having thereon a conducting blade 40 which contacts with the fixed contacts 35—35, permitting the solenoid to be energized. The contacts 35—35 are preferably set at an angle to each other, and the conducting blade 40 is so fashioned as to contact therewith with a wedge-like action. The pivot or supporting point 55 is preferably so located relatively to the blade 40, that a line drawn through the contact points will pass through the point 55 when the switch is closed.

Figure 7:
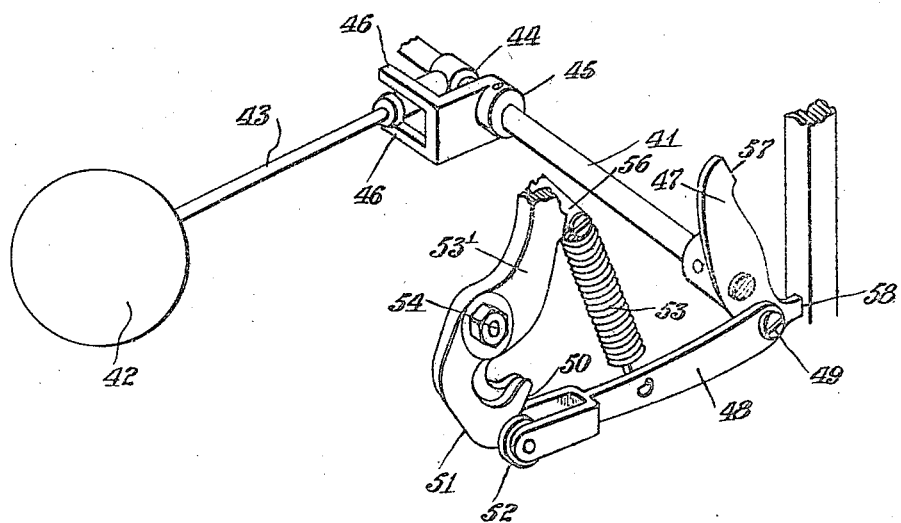
Fig. 7 is an enlarged detailed perspective view of some of the parts shown in Fig. 6.

The operation of the switch is controlled by means of the level of the liquid in the trap chamber. In the form shown, a shaft 41 extends from the interior of the trap chamber through one wall and into the switch chamber. A float 42 is adapted to actuate the switch mechanism above described, and a lost motion connection is preferably provided between the float and the switch mechanism so as to permit the latter to be actuated at about the extreme positions of the float. In the present disclosure, the float 42 has a stem 43 which is loosely mounted on the shaft 41, as indicated at 44. A boss 45 is fixedly secured to the shaft 41, and a pair of fingers 46, 46 extend over and embrace the float stem 43 so as to permit a limited relative motion of the stem and float without actuating the shaft 41. Within the switch chamber is a crank 47 mounted on the shaft 41. This crank is preferably fixedly mounted on the shaft since, in the form shown, the lost motion connection has been provided between the float and the shaft. A follower link 48 is pivoted to the crank at 49, and the opposite end engages one of two cam surfaces 50—51. If desired, one or more rollers 52 may be interposed between the link 48 and the cam surfaces. A coil spring 53 has been shown to constantly urge the link 48 upwardly and into contact with the cam surfaces. The switch lever 53' is pivoted in the switch casing at 54. The upper end of this switch lever carries the bridging contact hereinbefore described, and the latter is preferably pivoted to the arm 53' as indicated at 55. The arm 53' may abut any suitable stop as indicated at 56 for limiting the movement of the arm in one direction, it being understood that the movement in the opposite direction will be limited by the fixed contacts and the bridging contact. Stops such as 57—58 may strike an abutment to limit the movement of the link 48 in both directions. The operation of my device is as follows:

Assuming the parts to be in the positions indicated in Figs. 1, 2, 3, and 5, it will be noted that the pressure in the vacuum or exhaust line 8 and in the trap chamber 9 will be equalized through the pipes 10 and 13, since the valve disc 26 is unseated and permits communication between the vapor space in the exhaust line and the trap chamber. Condensate will flow down through the pipe 10 and as the condensate fills the trap chamber, the float will rise. When the trap chamber has filled to a predetermined limit, the float stem 43 will contact with the upper finger 46 (Fig. 7) and further upward movement of the float will cause the shaft 41 to be rotated and the crank 47 will force the link 48 toward the left as viewed in Figs. 2 and 7. The link 48 will ride along the cam surface 50 until the lower end is reached and passed, after which the spring 53 which was stressed during the movement just described will draw the free end of the link 48 upwardly along the cam surface 51. The switch arm 53 will consequently be quickly thrown so as to cause the bridging contact 40 to connect the two fixed contacts in the switch chamber. As soon as these contacts are connected the current will flow through the solenoid coils and the core 31 will be drawn downwardly. The core in moving downwardly will force the motive fluid valve downwardly so as to seat the disc 26 and unseat the disc 27. Communication between the exhaust line and the interior of the trap chamber will then be cut off, and communication between the pipe 15 and the interior of the trap chamber will be established. Motive fluid such as steam, will then flow through the pipe 15 and force the condensate in the trap chamber out through the outlet pipe 11. When the trap chamber has been emptied to the predetermined extent, the float stem 43 will contact with the lower finger 46 and rotate the shaft 41 in the opposite direction to that heretofore described. The link 48 will then be drawn toward the right as viewed in Figs. 2 and 7 until the free end passes the lower end of the cam surface 51, after which the spring will draw the free end of the link 48 upwardly along the cam surface 50 and cause the bridging contact 40 to move to the right, and consequently break the circuit to the solenoid. When the circuit is broken, the spring 33 will immediately raise the lever 29 and valve to their original upper positions so as to cut off the supply of motive fluid and again establish communication between the exhaust line and the trap chamber.

While I have described the invention as applied to draining an exhaust line, and have described the motive fluid as steam, I wish it understood that liquid may be taken from any suitable source other than an exhaust line, and that motive fluids other than steam may be used. When liquid is taken from a source not under reduced pressure, the motive fluid exhaust pipe would preferably open into the atmosphere.

While I have described in great detail a preferred form of my invention, I wish it understood that modifications and changes may be made within the scope of the appended claims.

I claim:

1. In a vacuum trap, a trap chamber for condensate, a pipe for conducting condensate from an exhaust line to said trap chamber, a liquid outlet pipe for said trap chamber, valve means for controlling the inlet and exhaust of pressure fluid to the chamber, a connection between said valve and the exhaust line, a connection between said valve and a steam line, electro-magnetic means operatively connected to said valve means for actuating the latter to control the flow of motive fluid to and from said chamber, a solenoid and switch chamber formed integrally with said trap chamber, a float in the trap chamber and adapted to rise and fall with the liquid level therein, a shaft for said float and extending into said switch chamber, quick break switch mechanism in said switch chamber for making and breaking the circuit to said electro-magnetic means, a lost motion connection between said float and said quick break mechanism, and a cover plate for said solenoid and switch chambers.

2. In a device of the character described, a trap chamber, liquid inlet and discharge means for said chamber, a switch chamber formed integrally with but separated from said trap chamber, switch mechanism in said switch chamber, a float in the trap chamber, an oscillatable shaft extending into the switch chamber and connected to said float, said float being adapted to actuate said switch mechanism and having a lost motion connection therewith, a solenoid to be energized by the closing of said switch, valve means for admitting and exhausting motive fluid to said trap chamber, said valve means being actuated in one direction by said solenoid.

3. In a device of the character described, a trap chamber, liquid inlet and outlet means for said chamber, valve means for controlling the inlet and exhaust of motive fluid in said chamber, electro-magnetic means for actuating said valve means, a switch for making and breaking the circuit of said electromagnetic means, a shaft extending thru said trap chamber, a float within the chamber and mounted on said shaft, a crank outside said chamber and mounted on said shaft, one of the members mounted on said shaft having a lost motion engagement therewith, and means coacting with said crank for operating said switch aforesaid.

4. In a device of the character described, a trap chamber having a liquid inlet and a liquid outlet, a motive fluid inlet and exhaust pipe, valve means for controlling the flow of motive fluid to said chamber, said valve being mounted on the outside of said chamber, a lever for operating said valve, a solenoid core connected to said lever, switch mechanism for controlling the circuit conditions to said solenoid, a float in said trap chamber, an oscillatory shaft on which said float is mounted and extending through one wall of said chamber, a crank on said shaft and on the outside of the trap chamber, one of the members on the shaft having a lost motion connection therewith, and a connection between said crank and said switch mechanism whereby upon the rise and fall of said float to its extreme positions will cause said switch to the opened and closed.

5. In a device of the character described, a trap chamber, liquid inlet and outlet pipes for said chamber, motive fluid inlet and outlet pipes for the chamber, a valve controlling said motive fluid inlet and outlet, a switch chamber formed integrally with said trap chamber, a float within the trap chamber and having means extending through one wall thereof for operating said switch, a solenoid connected to said switch, means of connection between said valve and said solenoid whereby when the float rises and falls the switch will be opened and closed and the solenoid will operate said valve in one direction.

6. In a device of the character described, a trap chamber, a combined switch and solenoid chamber formed integrally with said trap chamber and having a wall to prevent communication between the trap chamber and the solenoid and switch chamber, a cover plate for closing said switch and solenoid chamber, valve means for controlling the admission and exhaust of motive fluid in said trap chamber, and means positioned in said switch and solenoid chamber for actuating said valve.

7. In a device of the character described, a trap chamber having liquid inlet and outlet means, means for admitting and exhausting motive fluid in said chamber, a float in the chamber, a shaft extending through a wall of the chamber and operatively connected to said float, a crank on said shaft and on the outside of said chamber, one of the members on said shaft having a lost motion connection therewith a switch arm, a resiliently pressed link connected to said crank and adapted to engage said switch arm, contacts to be connected by said switch arm, and electro-magnetic means energized by means of current through said switch for actuating the valve controlling the motive fluid.

8. In a device of the character described, a trap chamber having inlet and outlet means, valve means for controlling the inlet and exhaust of motive fluid in said trap chamber, a shaft extending through the wall of said chamber, a float having an arm rotatably mounted on said shaft, a member having a pair of spaced fingers embracing the float stem, said member being fixedly secured on said shaft, a crank secured to said shaft, a link secured to said crank, a spring for resiliently urging said link in one direction, a switch arm having two cam surfaces to be engaged by said link and for moving the switch arm in opposite directions when the float rises and falls to extreme positions within the chamber, a pair of stationary switch contacts, a bridging contact connected to said switch arm, and an electro-magnetic means controlled by said switch for actuating the valve controlling the inlet and exhaust of motive fluid in said trap chamber.

9. A tank control including a switch having two stationary contacts, a pivoted arm, a contact member hinged to one end of said arm and a cam on the other end of said arm, a crank, a swinging link connected to said crank, engaging said cam, and a spring pulling said link toward said cam, said arm being pivoted between said crank and said switch.

10. A tank, a float therein, a shaft extending outside of said tank, a lost-motion connection between said float and said shaft, an external switch having a movable contact member, a pivoted arm carrying said contact member, a cam carried by said arm, an external crank on said shaft, a link connected to said crank and having a connection with said cam, and spring means for pressing said link against said cam.

IRVIN H. KAUFMAN.